Aug. 8, 1967    J. DOUGLASS, JR., ET AL    3,334,951
EXAMINING TABLES
Filed Aug. 20, 1965    13 Sheets-Sheet 1
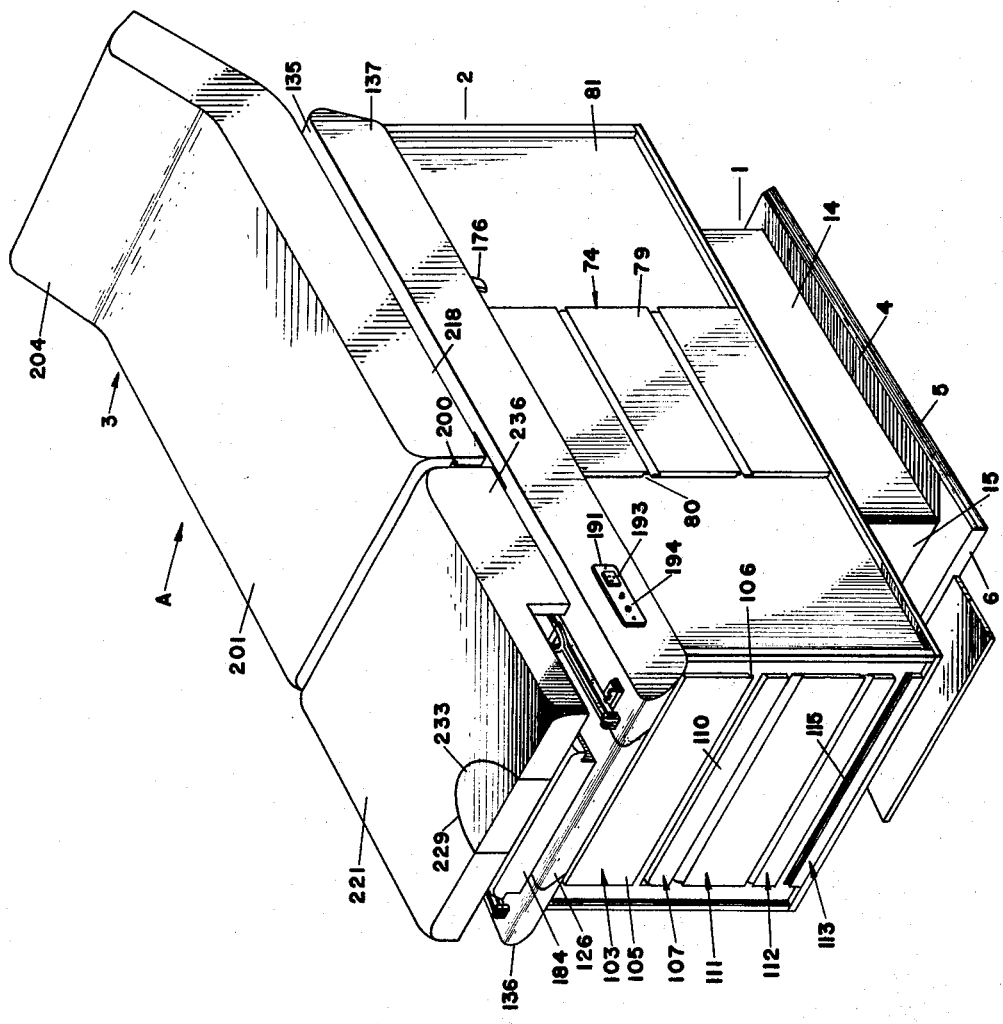
FIG. 1
INVENTOR.
JOHN DOUGLASS JR. &
GEORGE R. CHERVENKA
BY
ATTORNEY Aug. 8, 1967 J. DOUGLASS, JR., ET AL 3,334,951
EXAMINING TABLES
Filed Aug. 20, 1965 13 Sheets-Sheet 2

INVENTOR
JOHN DOUGLASS JR. &
GEORGE R. CHERVENKA
BY
ATTORNEY

INVENTOR
JOHN DOUGLASS JR. &
GEORGE R. CHERVENKA
BY

ATTORNEY

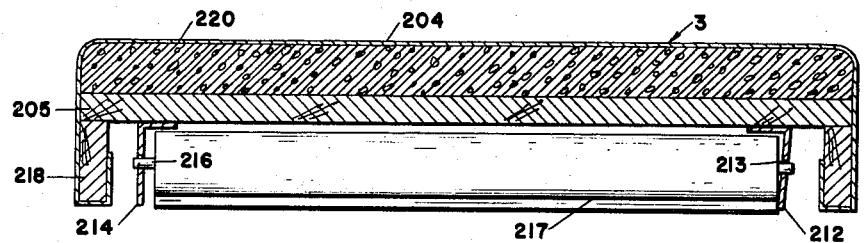
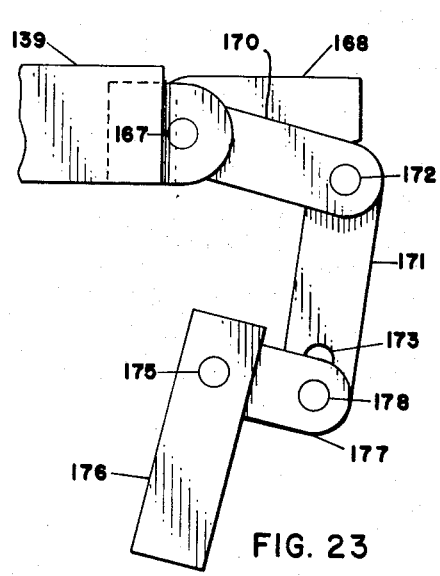
FIG. 23
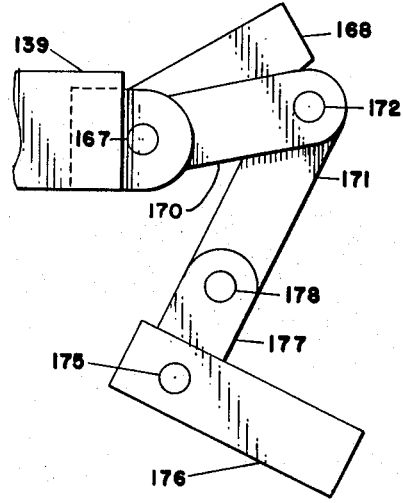
FIG. 24
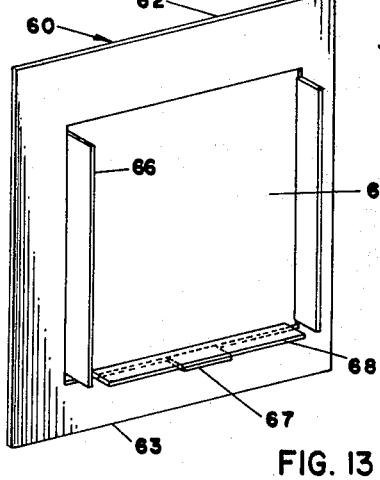
FIG. 13
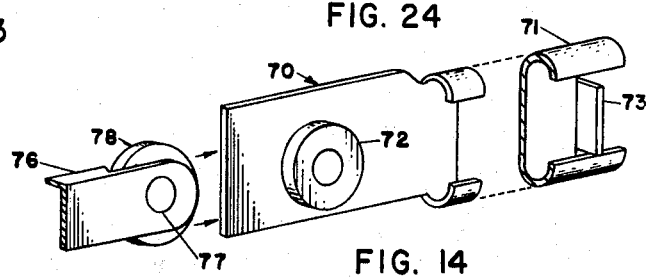
FIG. 14

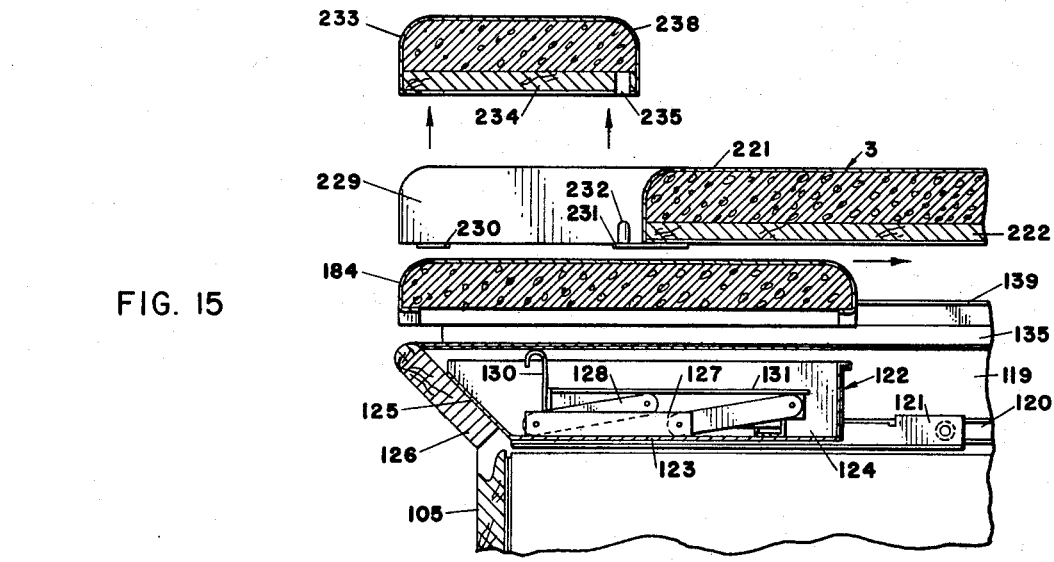
FIG. 15
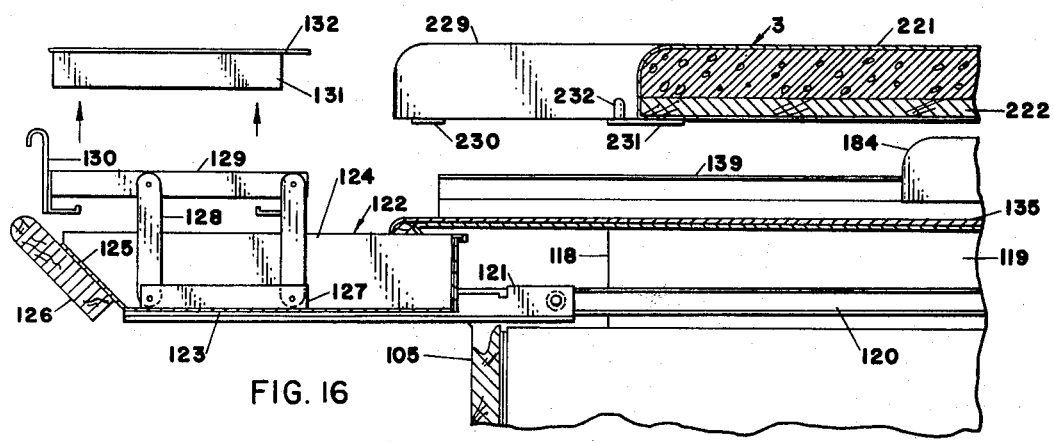
FIG. 16
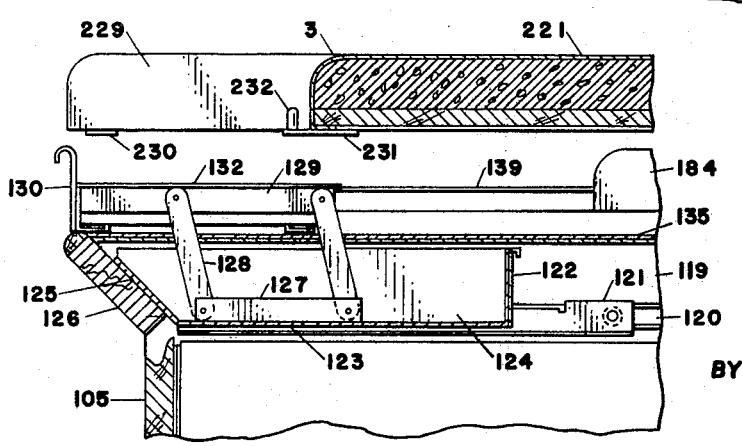
FIG. 17
INVENTOR
JOHN DOUGLASS JR. &
GEORGE R. CHERVENKA
BY 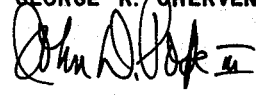
ATTORNEY

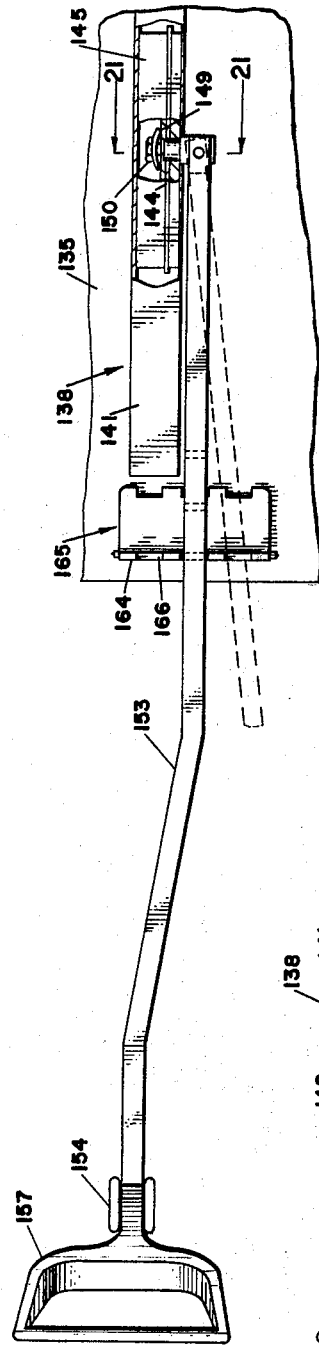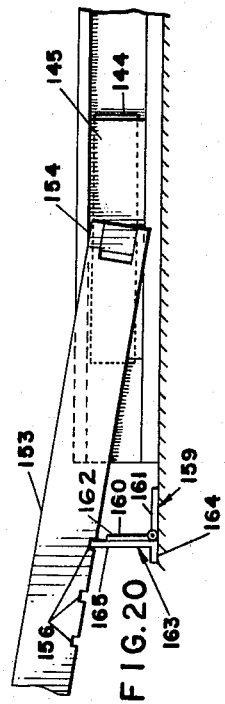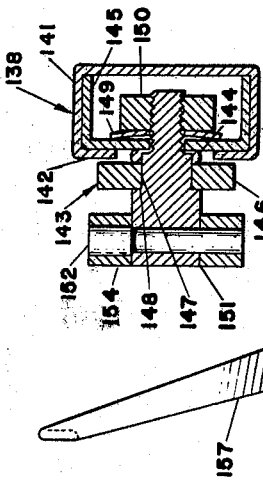

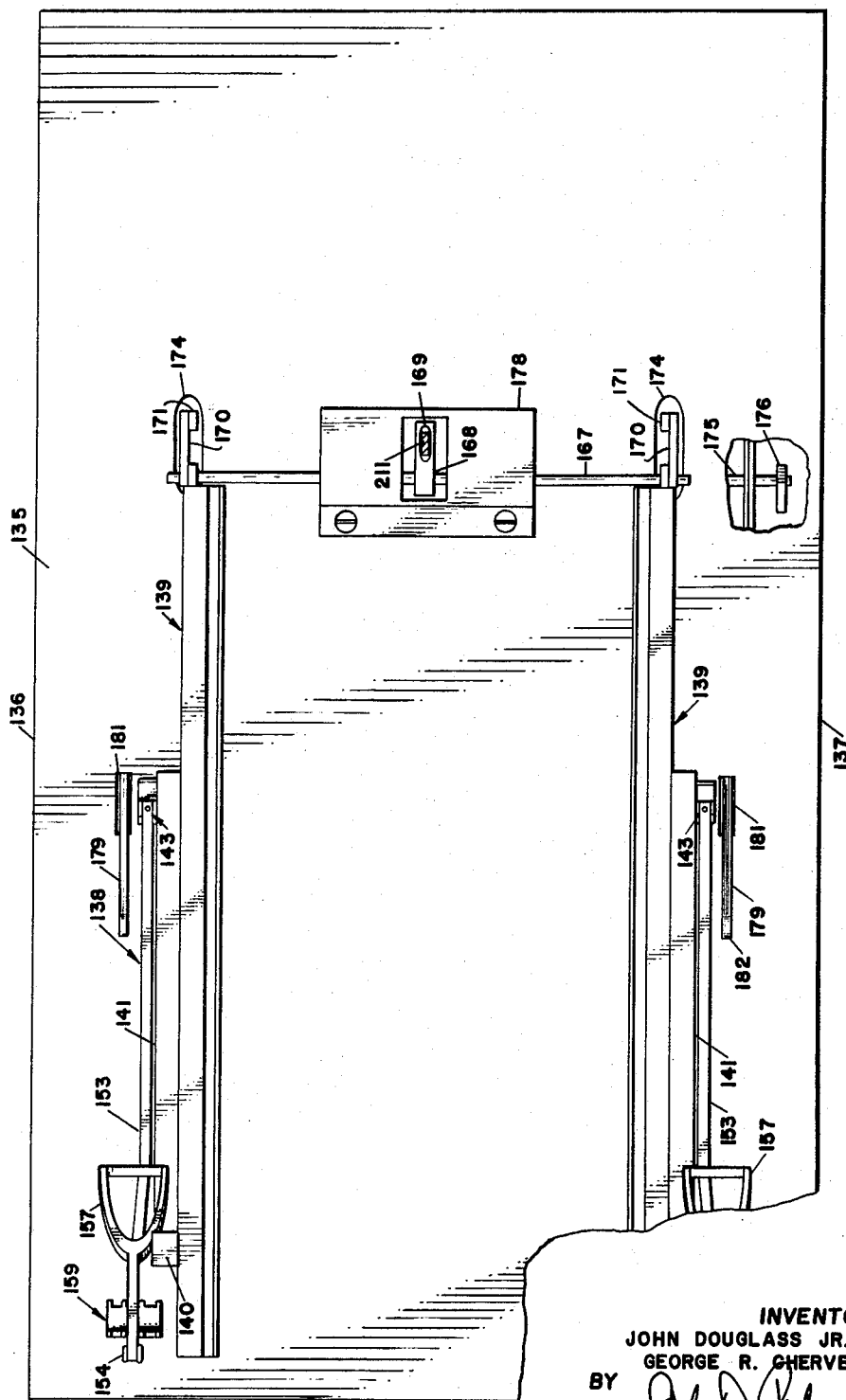
FIG. 22
INVENTOR
JOHN DOUGLASS JR. &
GEORGE R. CHERVENKA
BY 
ATTORNEY

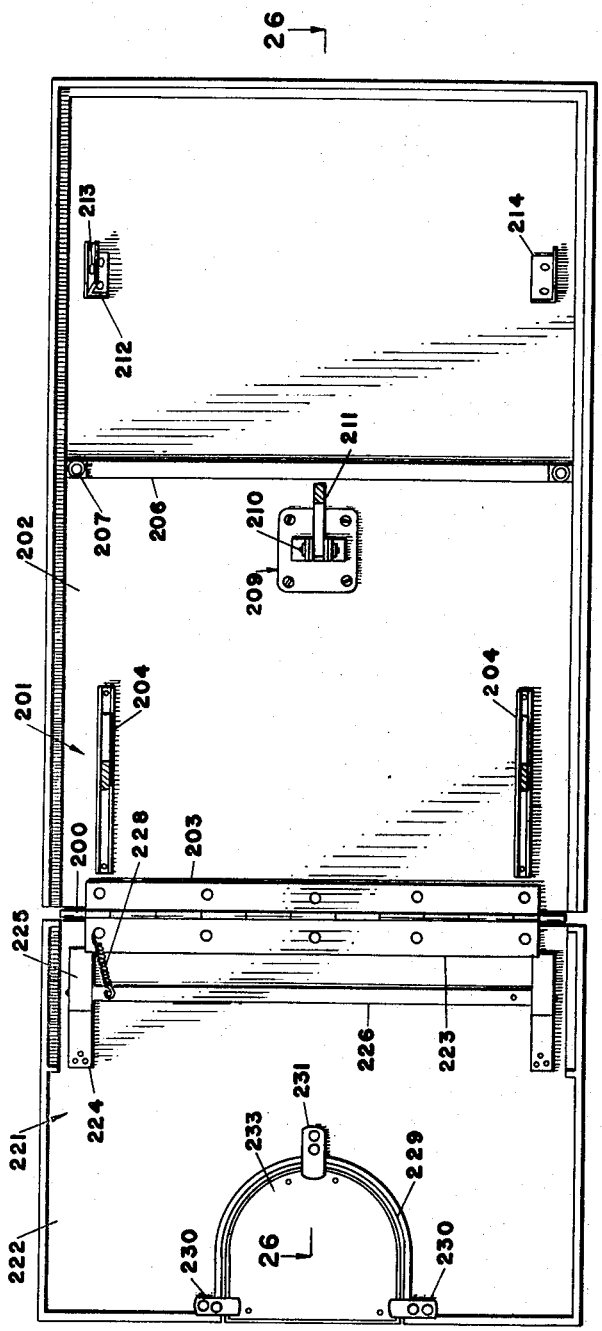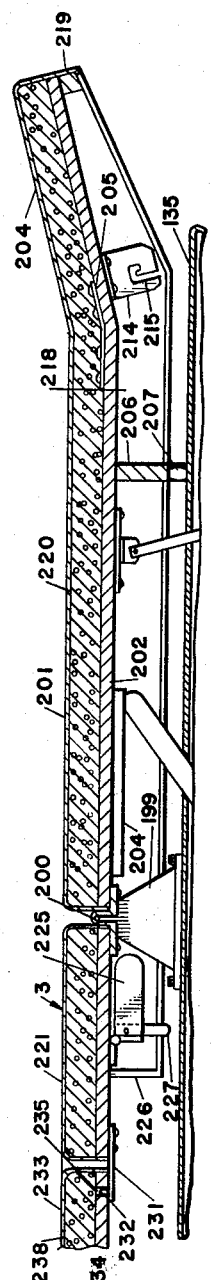

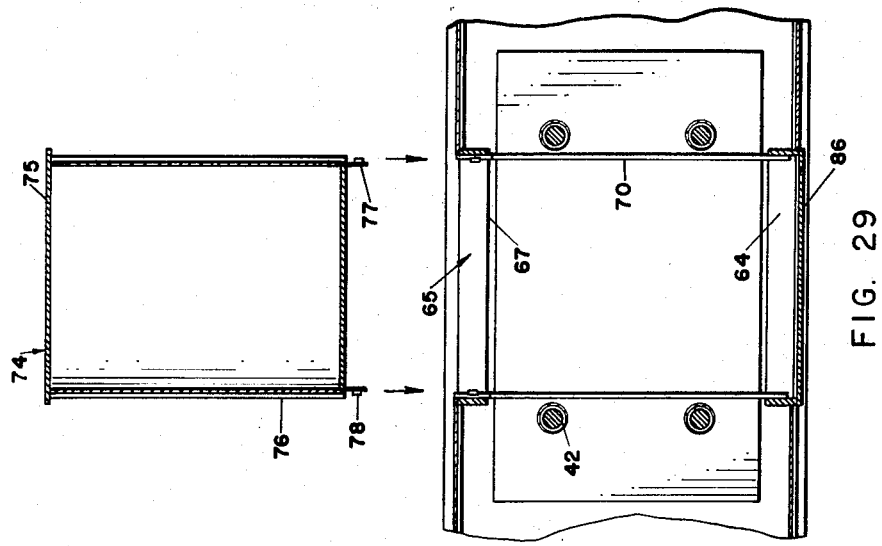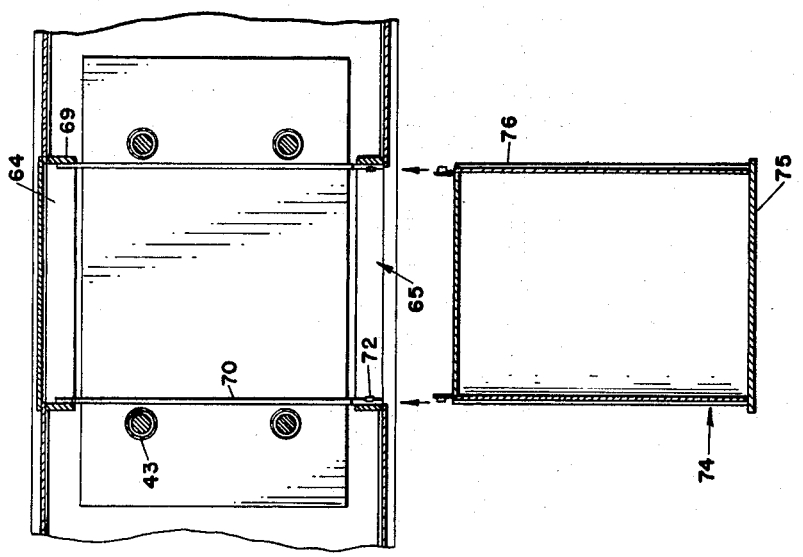

United States Patent Office 3,334,951
Patented Aug. 8, 1967

3,334,951
EXAMINING TABLES
John Douglass, Jr., Creve Coeur, and George R. Chervenka, St. Louis, Mo., assignors to Affiliated Hospital Products, Inc., a corporation of Delaware
Filed Aug. 20, 1965, Ser. No. 481,238
24 Claims. (Cl. 312—209)

This invention relates in general to examining tables and, more particularly, to a physician's examining table, capable of assuming a multitude of positions and having extreme versatility.

It is the primary object of the present invention to provide a physician's examining table having a top section which is capable of assuming a multitude of configurations and positions in upwardly spaced relation to the floor on which the table rests.

It is an additional object of the present invention to provide an examining table of the type stated having a back section, the angular position of which is adjustable from either side of the table.

It is a further object of the present invention to provide an examining table of the type stated which can quickly be adapted for primary operation from either one side or the other.

It is another object of the present invention to provide an examining table of the type stated having a power operated elevating mechanism.

It is an additional object of the present invention to provide an examining table of the type stated having a seat section provided with a perineal cut-out and a catch pan removably located below the cut-out.

It is a further object of the present invention to provide an operating table of the type stated having adjustable heel stirrups which can be pushed slidably into the table so as not to interfere with the physician's movements when not in use.

It is another object of the present invention to provide an examining table of the type stated which is attractive in appearance, rugged in construction, and economical to manufacture.

It is still another object of the present invention to provide an examining table of the type stated having a plurality of storage drawers and a plurality of support members at various heights which when not in use are stored within the confines of the table so as not to interfere with the physician's movements.

With the above and other objects in view, our invention resides in the novel features of form, construction, arrangement, and combination of parts presently described and pointed out in the claims.

In the accompanying drawings—

FIG. 1 is a perspective view of an examining table constructed in accordance with and embodying the present invention;

FIGS. 5 and 6 are sectional views taken along line 5—5 of FIG. 4;

FIG. 13 is a perspective view of a vertical drawer supporting frame forming part of the present invention;

FIG. 14 is an exploded fragmentary perspective view of a drawer track and guide rail forming part of the present invention;

FIG. 15 is a fragmentary sectional view taken along line 15—15 of FIG. 3 showing the filler section removed from the perineal cut-out;

FIG. 16 is a fragmentary sectional view showing the pan mount in its outer-most elevated position with the pan removed therefrom;

FIG. 17 is a fragmentary sectional view showing the pan mount in its elevated position with the pan disposed beneath the perineal cut-out;

FIG. 18 is a fragmentary plan view, partly broken away and in section, of a stirrup assembly forming part of the present invention;

FIG. 19 is an elevational view of the stirrup assembly showing the heel stirrup folded down in dotted lines;

FIG. 20 is a fragmentary elevational view showing the heel stirrup assembly in an elevated position;

FIG. 21 is a sectional view taken along line 21—21 of FIG. 18;

FIG. 22 is a fragmentary plan view, partially broken away of the cabinet section, the top section being removed therefrom;

FIG. 23 is an elevational view of the linkage mechanism which locks the back-section in a given angulated position;

FIG. 24 is an elevational view of the linkage mechanism in the disengaged position;

FIG. 25 is a sectional view taken along line 25—25 of FIG. 2 and having the paper roll removed from its supporting brackets;

FIG. 26 is a fragmentary sectional view taken along line 26—26 of FIG. 25;

FIG. 27 is a sectional view taken along line 27—27 of FIG. 2;

FIG. 28 is a fragmentary sectional view taken along line 28—28 of FIG. 12; and

FIG. 29 is a fragmentary sectional view similar to FIG. 28, but showing the drawers operatively mounted for withdrawal from the opposite side of the examining table.

Figure 2:
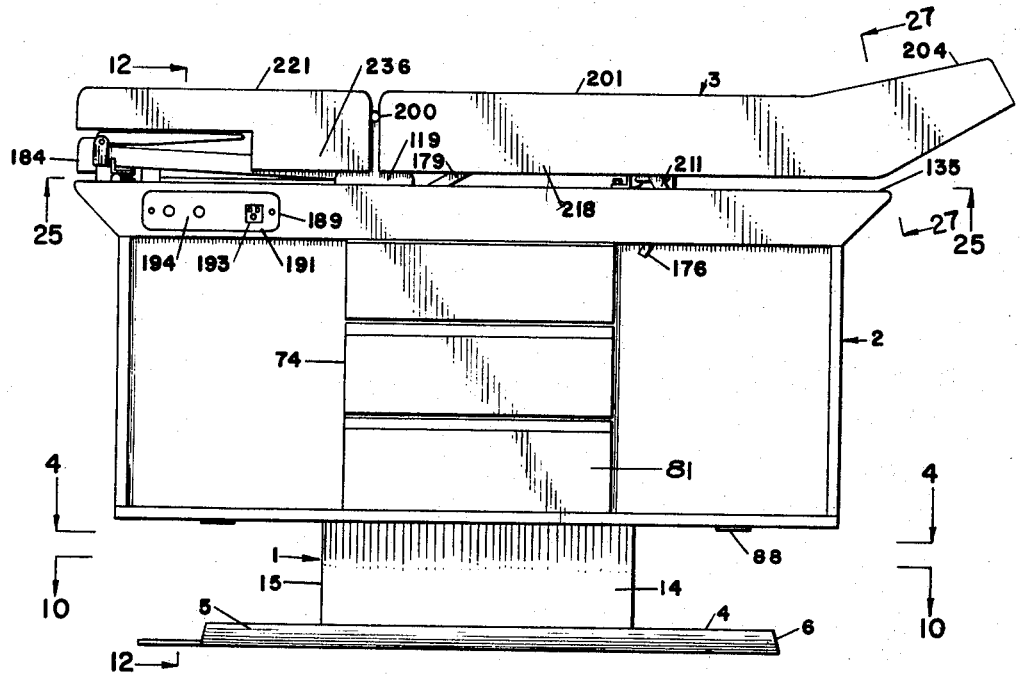
FIG. 2 is a side elevational view of an examining table constructed in accordance with and embodying the present invention.

Referring now in more detail and by reference characters to the drawings which represent a preferred embodiment of the present invention, A designates an examining table including a base assembly 1, a cabinet section 2, and body supporting or top section 3.

Base assembly 1 includes a base plate 4 having beveled side walls 5 and end walls 6. Longitudinally extending and welded or otherwise securely fastened to the side walls 5 and the underface of base plate 4 are the L-shaped support members 7 having the adjustable feet 8 threadedly mounted therein in close proximity to the corners of base plate 4. Also welded to the underface of the plate 4 in inwardly spaced relation to the support members 7 are longitudinally extending U-shaped channels 9. On its upper face the base plate 4 is provided with a channel shaped support member 10 having an upper wall 11 which is in spaced parallel relation to the base plate 4. Welded to the vertical leg forming portions of support member 10 in spaced parallel relation to the upper wall 11 thereof is an intermediate plate 12, all as best seen in FIG. 6. Welded or otherwise secured to the base plate 4 and extending around the perimeter of support member 10 are the spacers 13 to which the upwardly extending side walls 14 and end walls 15 are fastened, the walls 14, 15 being further joined at their transverse margins to form a box-like enclosure.

Bolted to the upper wall 11 of support member 10 is a motor support plate 16 to which is bolted an electric motor 17 provided with a conventional right angle drive gearbox 18 having a drive shaft 19 projecting downwardly therefrom, perpendicular to the upper wall 11. Motor 17 is insulated from upper wall to reduce transference of vibrations by a plurality of rubber or other suitable bushings 20 and is provided a power cord 21 which terminates at a plug 22. Operatively secured to the drive shaft 19 for purpose presently more fully appearing is a sprocket 23.

Substantially midway between the side walls 14 and in close proximity to the end walls 15, the upper wall 11 of support member 10, the intermediate plate 12 and the base plate 14 are provided with the axially aligned apertures 24ª, 24ᵇ, and 24ᶜ, respectively, which receive the elevating mechanisms 25, as will presently be described. Each of the elevating mechanisms 25 includes a cylindrical sleeve 26 which fits snugly within the apertures 24ª, 24ᵇ, and 24ᶜ, the outer face of the sleeve 26 being welded to the margins thereof. Internally, at each end the sleeve 26 is provided with sleeve bearings 27 in which an elevating shaft 28 is journaled. At its lower end the elevating shaft 28 is provided with a nut 29 to prevent removal thereof and, interposed between the nut 29 and the bottom annular end of the sleeve 26, is a washer 30. Intermediate its ends the shaft 28 is fitted within a thrust bearing 31 having a lower race 32 which abuts against the upper annular face of the sleeve 26, an upper race 33, balls 34 which are interposed between the races 32, 33, and a bearing retainer 34' for holding the thrust bearing assembly 31 together in operative relation. Rigidly secured to the shaft 28 so as to permit its hub to annularly abut against the thrust bearing 31 is a sprocket 35 which is coplanar with the sprocket 23. The upper portion of shaft 28 is provided with threads which carry the nut 36, which in turn carries the radially extending elevating arm 37. Elevating arm 37 includes a bight portion 38 transversely connected to spaced parallel flanges 39 having axially aligned apertures 40 which loosely accommodate the shaft 28. As will be seen by reference to FIG. 8, the nut 36 fits snugly between the flanges 39 and is compressed therebetween by the bolts 41 which extend through the flanges 39 on either side of the nut 36.

On each side of the elevating mechanisms 25 in close proximity to the end walls 14, the upper wall 11 of support member 10, the intermediate plate 12, the base plate 4, and the U-shaped channels 9 are provided with axially aligned apertures 41ª, 41ᵇ, 41ᶜ, 41ᵈ, respectively, which snugly accommodate the upstanding rods 42 which are rigidly welded therein. Telescopically fitted over the rods 42 are the tubular supports 43 which are diametrally reduced in the provision of annular grooves 44, the inner surfaces of which slidably receive rods 42. At their upper ends the tubular supports 43 are provided with flanged caps 45 having downwardly projecting flanges 46 which are drilled in the provision of axially aligned apertures 47. Intermediate its ends the outer surface of each of the tubular supports 43 is provided with radially projecting ear 48 which is sized to snugly fit between the opposed flanges 39 of the elevating arm 37, the ears 48 being rigidly secured to the arm 37 by the bolts 49.

Figure 8:
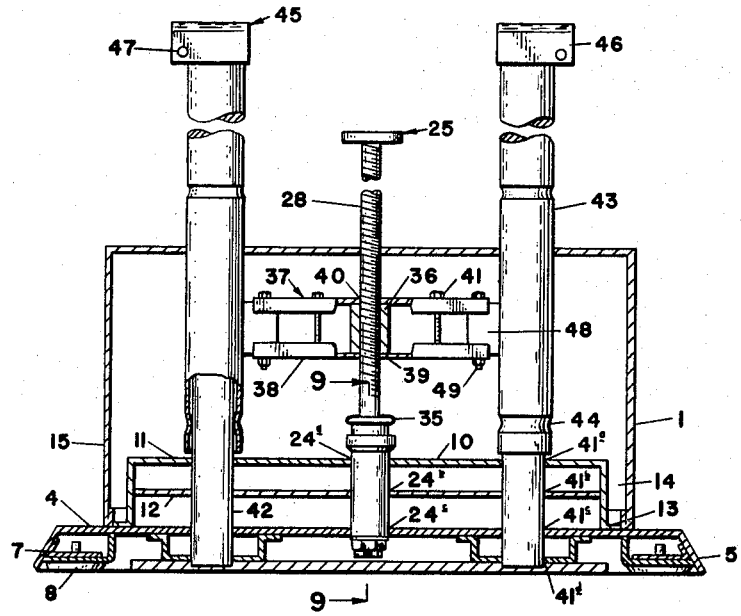
FIG. 8 is a sectional view taken along line 8—8 of FIG. 4.

By reference to FIG. 8, it can be seen that a rotation of the shaft 28 will move the nut 36 either up or down thereon, depending on the direction of rotation. The elevating arm 37, being secured thereto, will experience a similar movement and will carry the tubular supports 43 disposed on either side of the shaft 28 upwardly or downwardly. It should be noted that the downwardly presented force carried by the tubular supports 43 will be transferred through the support arms 37, and nut 36 to the shaft 28, and thence through the thrust bearing 31 to the sleeve 26 and support member 10, intermediate plate 12, and base plate 4.

Figure 10:
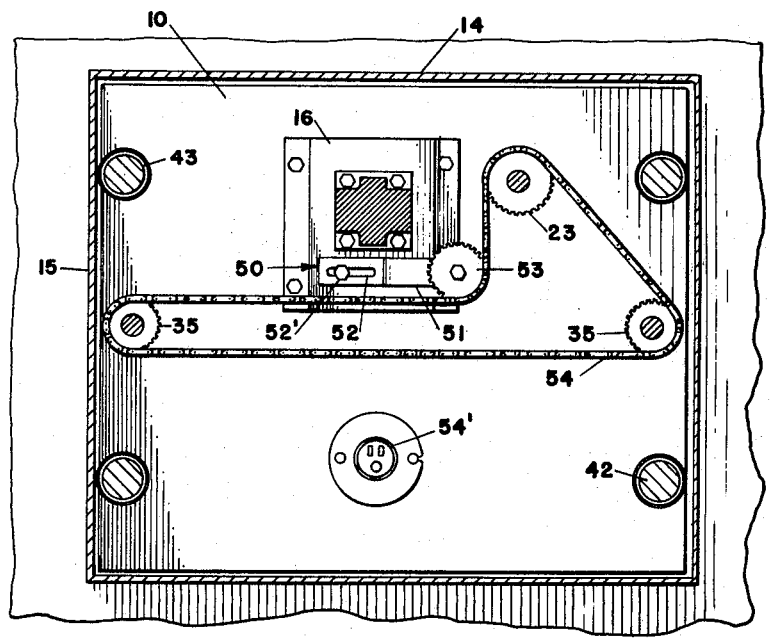
FIG. 10 is a fragmentary sectional view taken along line 10—10 of FIG. 2.

Operatively mounted on motor support plate 16 is an idler assembly 50 including a movable element 51 provided with an elongated slot 52 which accepts the bolt 52' for optional positioning of the idler assembly 50. Carried by the movable element 51 in a plane defined by the sprockets 23, 35 is an idler sprocket 53. Trained around the sprockets 23, 35, 53 is a chain 54 which transmits power from the drive shaft 22 to the sprockets 35, thereby elevating the tubular supports 43. As will be seen by reference to FIG. 10 the slack within the chain 54 can be taken up by adjusting the idler assembly 50.

Mounted in the upper wall 11 of support member 10 is a conventional electrical receptacle 54' having an electrical cord 54'' leading therefrom through the base plate 4 for connection to an electrical power source.

Figure 11:
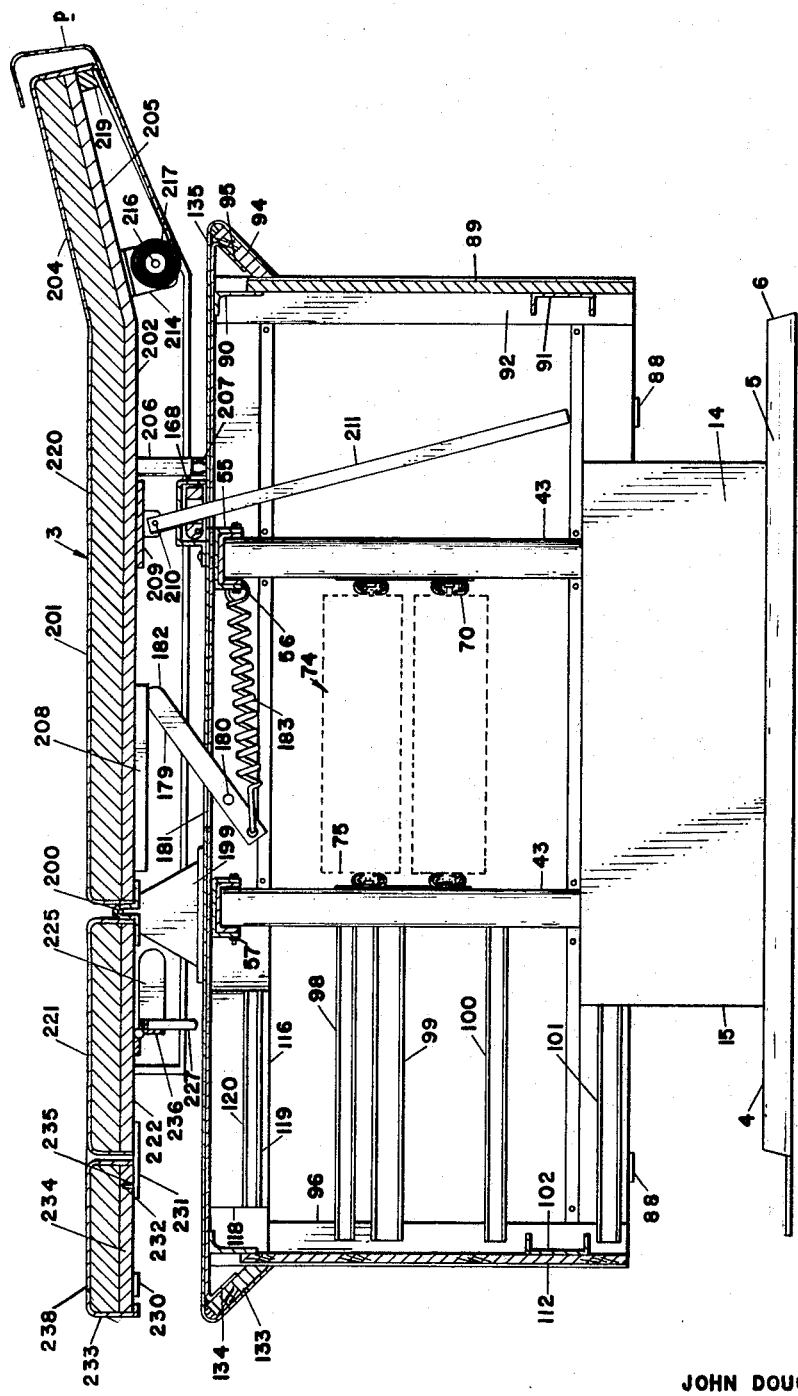
FIG. 11 is a sectional view taken along line 11—11 of FIG. 3.

Operatively supported on the tubular legs 43 is the cabinet section 2 including two cross channels 55, 56 having the downwardly projecting flanges which accommodate the flanged caps 45 of tubular supports 43, the caps 45 being secured to the channels 55, 56 by pins 57 as best seen in FIG. 11. At their transverse ends the channels 55, 56 are welded to two longitudinally extending upper side channels 58, 59 shaped in the configuration best illustrated in FIG. 12.

Rigidly secured to the side channels 58, 59, and depending therefrom are rectilinear vertical frames 60, 61 each comprising flat top and bottom cross members 62, 63, respectively, integrally joined to vertical members 64, whereby to provide a rectilinear opening 65. Formed integral to and projecting outwardly from vertical inner margins of vertical members 64 are angle forming flanges 66. The bottom margin of rectilinear opening 65 is also provided with an integral flange 67 to which is welded the angle member 68, all as best illustrated in FIG. 13. For purposes presently more fully appearing, it should be noted that the transverse dimension of the rectilinear opening 65 is slightly less than the longitudinal distance between the opposed tubular supports 43. The top cross members 62 are bolted or otherwise rigidly secured to the inner faces of the side channels 58, 59 so that the vertical inwardly presented margins of the openings 65 lie in vertical planes which pass inwardly of the tubular supports 43.

Bolted to the flanges 66 are the track support plates 69 to which conventional drawer tracks 70 are rigidly secured in opposed pairs. As will be seen by reference to FIG. 12, the tracks 70 extend transversely across the cabinet section 2, being supported at each end by the frames 60, 61. Tracks 70 are provided with two opposed vertical flanges 71 and at their forward ends, that is to say the left end as seen in FIG. 13, each is provided with a support wheel 72. Rearwardly of the support wheel 72 the upper flange 71 is cut away for purposes presently more fully appearing. At their other ends the tracks 70 are provided with inwardly projecting stop tabs 73.

Slidably mounted on each of the pairs of opposed tracks 70 is a drawer 74 having side walls 75 to which conventional guide rails 76 are secured. The guide rails 76 are provided with flange 77 which is sized and adapted to ride on the wheel 72 of track 70. Journaled to the guide rail 76 at its rearwardly presented end is a wheel 78 which is sized to ride in the flange 71 of the track 70. The drawers 74 are provided with attractively finished wood front walls 79 having their lower margins grooved in the provision finger grooves 80. The upper of drawers 74 has a squared off top margin while the lower of the drawers 74 has a top margin which is grooved to provide finger clearance for one desiring to open the upper of the two drawers 74. One can completely remove a drawer 74 from the cabinet section 2 by withdrawing it until the wheel 78 is aligned with the cut out portion of the upper flange 71, whereupon the drawer is lifted upwardly and rearwardly.

Secured to the outwardly presented faces of the angle forming flanges 66 and the angle member 68 of frame 60 is a wood panel 81 which is finished to match the front walls 79 of the drawers 74, the panel 81 having a top margin which is grooved to provide finger clearance for one desiring to open the lower of the drawers 74.

Welded or otherwise securely fastened to the outwardly presented faces of the bottom cross member 63 of frames 60 and 61 are the lower side channels 82, 83 which are identical in configuration to and coplanar with the upper side channels 58, 59, respectively.

Fastened to the upper and lower side channels 58, 82 by a plurality of screws on either side of the drawers 74 are the attractively finished side panels 84, 85. Similarly fastened to the upper and lower side channels 59, 83 is a side panel 86.

At this juncture it should be noted that the side panels 84, 85, 86 can be easily detached from their respective upper and lower side channels 58, 59 and 82, 83 and, similarly, the panel 81 can be detached from the frame 60. After removing the drawers 74 one can unbolt the track support plates 69 from the flanges 66 and replace them in reverse order, that is to say, so that the forwardly presented ends of the track 70 are in juxtaposition to the frame 61 instead of the frame 60. Thereupon the panel 81 can be attached to the lower portion of the frame 61 and on each side thereof the side panels 84, 85 can be secured to the upper and lower side channels 59, 83. The opposite side panel 86 fits on the upper and lower side channels 58, 82, thereby completing the reversal. Thus, depending on the physician's preference, the drawers 74 can be fitted into either side of the cabinet section 2, the interchange requiring little time and inconvenience.

Welded to and transversely connecting the lower side channels 82, 83 on each side of the base assembly 1 are cross members 88. At its head end, that is to say the right end as seen in FIG. 11, the cabinet section 2 is provided with a closure forming head panel 89 which is secured near its upper margin to an angle forming cross member 90, which, in turn, is welded to the upper side channels 58, 59. Near its lower margin the head panel 89 is screwed to a cross channel 91 which is welded to the inwardly presented flanges of vertical angles 92, 93 which, in turn, have their outwardly presented flanges partially cut away at either end to accommodate the upper and lower side channels 58, 59, and 82, 83 to which they are welded. Obliquely disposed to the head panel 89 along its upper margin is an oblique panel 94 which is screwed to a backing plate 95, the latter in turn being welded otherwise fastened to the upper faces of the upper side channels 58, 59.

At its foot end, that is to say the left end as seen in FIG. 11, the cabinet 2 is internally provided with two vertically extending angles 96, 97 having outwardly presented flanges which are partially cut away to accommodate the upper and lower side channels 58, 82 and 59, 83, respectively, and inwardly presented flanges which are welded to the inner faces of the channels 58, 82, and 59, 83, respectively. The inwardly presented flanges of vertical angles 96, 97 are coplanar with the vertical members 64 of frames 60, 61, respectively, and along with the vertical members 64 support pairs of spaced parallel conventional drawer tracks 98, 99, 100, 101, which are bolted thereto. The drawer tracks 98, 99, 100, 101, being similar in design and operation to the drawer tracks 70, are therefore not described in further detail herein. Intermediate the tracks 100, 101 the angles 96, 97 are welded to a transversely extending cross channel 102.

Slidably mounted in the tracks 98 is a drawer 103 having guide rails 104 which engage the tracks 98 in a manner similar to that previously described in connection with tracks 70 and guide rails 76 of drawers 74. Drawer 103 is provided with an attractively finished front wall 105 having a lower finger groove 106 for enabling one to grasp the drawer 103 and pull it outwardly.

Operatively mounted on the tracks 99 in downwardly spaced relation to the drawer 103 is a knee rest 107 including a base 108 having guide rails 109 secured to each side thereof for engagement with the tracks 99 in a manner similar to that of drawers 74. The upper face of base 108 is upholstered with an attractive covering 110, the latter being stuffed with foam rubber or other cushioning material.

Operatively mounted on the tracks 100 is a drawer 111 which is similar in every respect to the drawer 103 and therefore will not be described herein in further detail. Screwed to the outwardly presented face of the cross channel 102 is a wood facing 112 which is finished to match the front wall 105 of drawer 103 and the front wall of drawer 111. The lower margin of wood facing 112 is squared off while its upper margin is grooved to provide finger clearance for one desiring to open the drawer 111.

Slidably mounted on the tracks 101 in downwardly spaced relation to the facing 112 is a foot rest 113, the sides of which are provided with guide rails 114 which engage the tracks 101 in the conventional manner previously described. On its upper face the foot rest 113 is provided with a tread 115 to insure adequate traction.

Welded or otherwise secured to the inwardly presented opposed vertical faces of the vertical angles 92, 93 at one end and the vertical members of frames 60, 61 at the other end are inwardly projecting support members 116, 117 having end walls 118 and longitudinal walls 119. Rigidly fastened to the longitudinal walls 119 in parallel relation and close proximity to the lower margin thereof are conventional tracks 120 which slidably receive and engage guide rails 121 of a pan mount 122. The cooperation between the rails 121 and tracks 120 and components thereof is conventional and has been described in greater detail herein in connection with the operation of drawers 74.

Referring now to FIG. 15, the pan mount 122 includes a rectilinear bottom plate 123 which is welded to upwardly extending side walls 124, the bottom plate 123 and side walls 124 being carried by the guide rails 121, as best seen in FIG. 16. At its forward end, that is to say the left end as seen in FIG. 15, the plate 123 is obliquely bent in the provision of a backing plate 125 to which is secured the wooden facing member 126. Bolted to the bottom plate 123 in parallel relation and close proximity to the side walls 124 are angles 127, having upstanding flanges to which swing arms 128 are journaled at one end. At their other ends the swing arms 128 are journaled to the side walls of a rectilinear frame 129. Centered on and projecting upwardly from the forward wall of frame 129 is a hooked handle 130. Frame 129 accommodates a pan 131 having flanges 132 which extend over the upper margins thereof.

By grasping facing member 126 one can pull the pan mount 122 outwardly on the tracks 120 similar to the conventional track mounted drawers 74. As best seen in FIG. 16, in the outermost position it is possible to grasp the handle 130 and pull the frame 129 up over center on the swing arms 128 until the lower margin of the forward wall of the frame 129 bears against backing plate 125 whereby to present the pan 131 in an elevated position, all for purposes presently more fully appearing.

At its foot end the cabinet section 2 is provided with obliquely disposed wood members 133 screwed to backing plates 134 which in turn are welded or otherwise secured to the vertical angles 92, 93 and upper side channels 58, 59. As will be seen by reference to FIG. 1, the wood members 133 are angulated so as to conform to the angle of and to rest flush with the outer surface of the wood facing member 126 when the pan mount 122 is in its innermost position.

The cabinet section 2 is also provided with a top cover 135 which is fabricated from stainless steel or other suitable corrosion resistant material. Top cover 135 is bent downwardly over the upper side channels 58, 59 in the formation of side walls or skirts 136, 137, and then inwardly bent once again. At its head end the cover 135 is bent over the oblique panel 94 and similarly at its foot end is bent over the wood members 133. The cover 135 at the foot end, however, is partially cut away to accommodate the pan mount 122 in an inner position with the frame 129 elevated.

Operatively mounted on the top section 135 at the foot end thereof are stirrup assemblies 138, each including a channel 139 which is bolted to the upwardly presented face of top cover 135 in parallel inwardly spaced relation to the upper side channels 58, 59. Facewise welded to the vertical outwardly presented face of the channel 139 is an upstanding seat support 140 and a slide channel 141 having opposed vertical flanges 142. The slide channel 141 accommodates a slide 143 which includes a spacer 144 interposed between and welded to a channel 145 and a bar 146. The channel 145 is sized to fit slidably within the slide channel 141, lateral displacement thereof being prevented by the opposed vertical flanges 142. When the slide 143 is operatively emplaced within the channel 141, the outer surface of the bar 146 will be presented beyond the outer faces of the vertical flanges 142. The center of slide 141 is drilled in the provision of an aperture 147 which accepts the threaded shank of a stud hinge 148, the latter being rotatably held to the slide 141 by a spring washer 149 and a nut 150 which fit within the channel 145. At its opposite or outwardly presented end, the stud hinge 148 is provided with two opposed flattened lands 151 which are centrally drilled to accept a pin 152. Hingedly secured to the stud hinge 148 by the pin 152 is a stirrup bar 153 provided at one end with a yoke 154 which snugly receives the lands 151. At its opposite end on each side thereof the bar 153 is provided with upwardly presented fork-forming elevents 154 which are fitted with a pin 155, the axis of the pin 155 being in spaced perpendicular relation to the axis of the pin 152. Intermediate its ends the bar 153 is bent slightly outwardly as best seen in FIG. 18, and is provided with a plurality of spaced notches 156 for purposes presently more fully appearing. Journaled on the pin 155 is a heel stirrup 157 having its end in close proximity to the pin 155 squared off in the formation of an abutment 158 which bears against the upper surface of bar 153 whereby to preclude rotation of the stirrup 157 beyond an angle approximately 90° to the centerline of bar 153.

Bolted to the upper face of top cover 135 in close proximity to the slide channel 141 is a stirrup height adjuster 159 including a hinge member 160 having a pin perpendicularly disposed to the centerline of channel 141, a leg 161 which is bolted to the top cover 135, and a shortened movable leg 162 which is welded to an adjuster element 163. The adjuster element 163 is angulated at 90° in the provision of a short leg 164 and a long leg 165, each of which is provided with a plurality of notches 166 sized to accommodate the bar 153.

When not in use the stirrup assembly 138 pushed inwardly on the slide 141 until the heel stirrup 157 is disposed beneath the outwardly projecting arm of the seat support 140, the bar 153 being disposed in the centermost of the notches 166 and the short leg 164 being presented vertically. Referring now to FIG. 19, it can readily be seen that stirrup assembly 138 can be put in use by pulling the bar 153 outwardly until one of the notches 156 engages one of the notches 166 of the adjuster element 163 and then swinging the heel stirrup 157 upwardly bringing the abutment 158 against the upper surface of the bar 153. One can change the height of the heel stirrup 157 by lifting the bar 153 up and turning the adjuster element 163 ninety degrees until the long leg 165 is presented vertically. Additionally the distance beyond the foot end of cabinet section 2 at which the stirrup 157 is disposed can be adjusted, by judiciously selecting notches 156 which engage the notches 166 of adjuster element 163. Similarly, the horizontal angular position can be adjusted by using different laterally spaced notches 166.

At the head end of the cabinet section 2, slightly beyond the cross channel 55 as best seen in FIG. 22, the channels 139 rotatably mount a cross rod 167 in upwardly spaced parallel relation to the cover 135. Approximately midway between the channels 139 the cross rod 167 is provided with a radially projecting ear 168 which is securely welded thereto and is provided with a slightly elongated aperture 169 having a longitudinal axis which is parallel to the channels 139. At each end beyond the vertical walls of the channels 139, the rod 167 is securely fastened to arms 170 which project radially therefrom and are angulated slightly downwardly from the ear 168. At their opposite ends the arms 170 are rotatably joined to connecting linkages 171 by pins 172, the connecting linkages 171 being provided at their opposite ends with elognated apertures or slots 173. At this juncture it should be noted that arms 170 and linkages 171 extend through elongated apertures 174 in the top cover 135 of cabinet section 2. Journaled in the vertical walls of channels 58, 59 in parallel spaced relation to the rod 167 is the cross shaft 175 mounting actuating levers 176 and substantially perpendicular actuating arms 177, the latter of which are provided with pins 178 which slidably engage the elongated apertures 173 of linkages 171. As will be seen by reference to the FIG. 1 the levers 176 project downwardly parallel to the side walls 136, 137 of top cover 135, terminating slightly beyond the bottom margin thereof in outwardly spaced relation to the panels 85, 86. Thus, by moving either of the actuating levers 176 toward the head end of cabinet section 2, one can cause the arms 177 to lift the linkages 171, which, in turn, will move the arms 170 and cause the rod 167 to rotate. The ear 168, being rigidly secured to the rod 167, will thereby experience an upward arcuate displacement, all for purposes presently more fully appearing. Bolted to the top cover 135 over and around the cross rod 167 and ear 168 is a hood-forming member 178.

Referring now to FIG. 11, the cabinet section 2 is internally provided with a pair of counterbalancing arms 179 which are journaled to the upper cross members 62 of frames 60, 61 and the upper side channels 58, 59 by pins 180. Arms 179 project upwardly through elongated apertures 181 which are cut in the top cover 135, the arms 179 terminating in accurate ends 182. At their opposite ends the arms 179 are hooked to counterbalancing springs 183 having their opposite ends hooked to the cross member 55.

Figure 12:
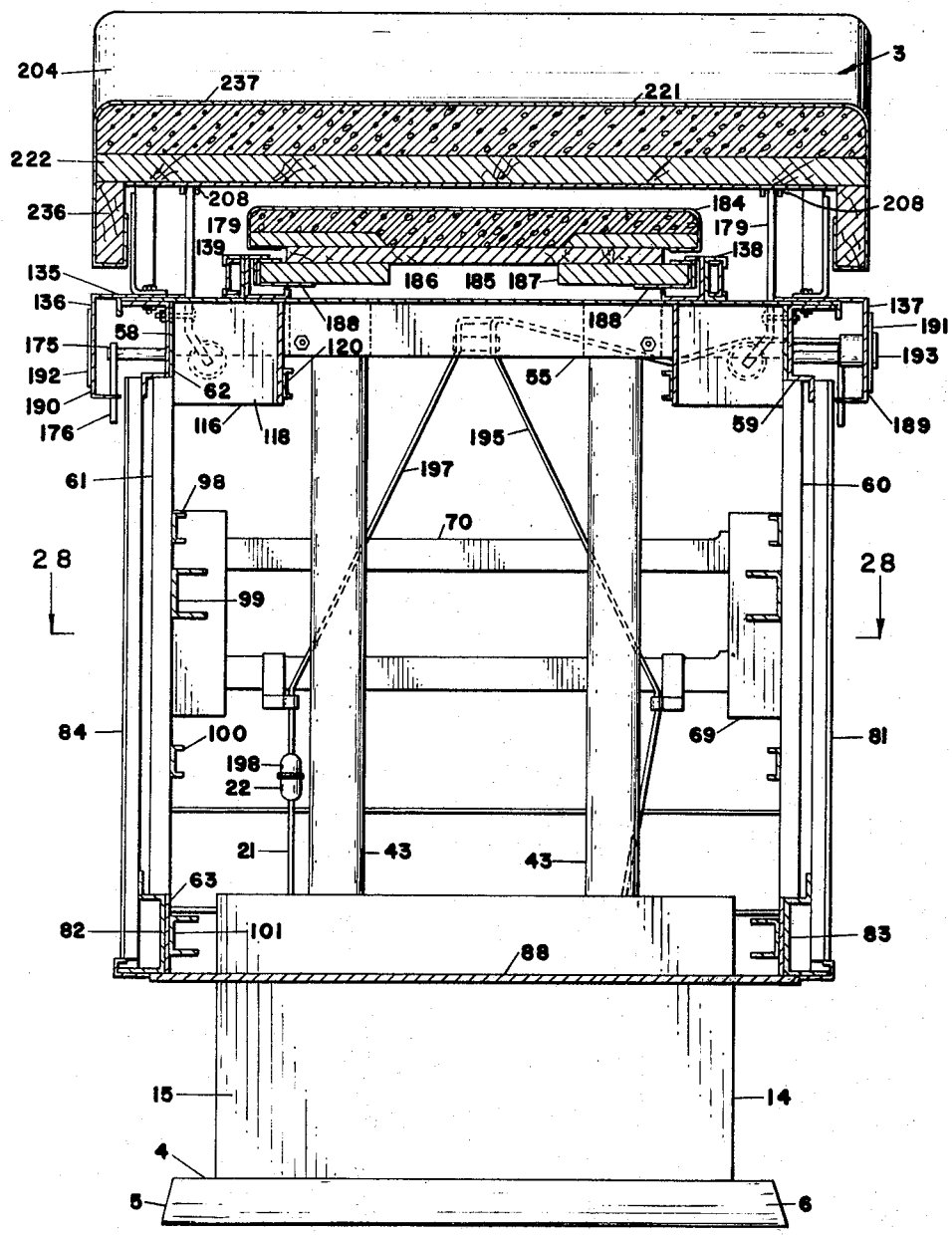
FIG. 12 is a sectional view taken along line 12—12 of FIG. 2.

Slidably mounted on the channels 139 between the stirrup assemblies 138, reference being made to FIG. 12, is a leg rest 184 including a wooden base member 185 to which are secured the laterally projecting upper and lower wooden members 186, 187, respectively. The lower wooden members 187 are partially covered with a metal facing 188 which slidably rides within and bears against the bearing surfaces of the channel 139. The upper base member and upper wooden member are covered with an attractively colored upholstery which is stuffed with foam rubber or other suitable cushioning material. Thus, the leg rest 184 slides out on the channels 139 beyond the foot end of the cabinet section 2.

Near its foot end of cabinet section 2, the side walls 136, 137, of top cover 135 are provided with cutouts 189, 190, respectively, the former of which is covered by a switch plate 191, and the latter of which is covered by a blank plate 192. Switch plate 191 mounts a conventional electrical receptacle 193 and a motor control switch 194 which is of conventional reversible control variety and, therefore, is not described herein in further detail. Switch 194 and receptacle 193 are ultimately connected to a conventional power source by a power cord 195 which extends through the channel 58 and down into the base section 1 where it is provided with a plug 196 which fits into the receptacle 54'. The switch 194 is further electrically connected to the motor 17 for reversible control thereof by a cord 197 which also extends along channel 58 and down into the base section 1 where it is provided with a female receptacle 198 which accepts the plug 22 of motor power cord 21. Thus, the height of cabinet section 2 can be controlled by manipulation of the switch 194. Moreover, blank plate 192 and switch plate 191 can be interchanged to provide height control from either side of the table A, depending on the physician's preference.

Bolted to the upper side channels 58, 59 through the top cover 135 and in close proximity to the cross channels 56 are upstanding triangular hinge pin supports 199 which hold a hinge pin 200 in upwardly spaced parallel relation to the top cover 135, the hinge pin 200, in turn, swingably mounting the top section 3 as will presently be described in greater detail.

Referring now to FIG. 26, top section 3 includes a back section 201 having a plywood or other suitable base member 202 to which, at one end margin, a transversely extending angled hinge plate 203 is secured, the hinge plate 203 having knuckles which receive the hinge pin 200. At its other end margin the base member 202 is in endwise abutment with a head rest member 204, it being rigidly secured thereto by plates 205. Intermediate its ends the base member 202 is provided with a downwardly projecting transversely extending leg 206 having elastomeric bumpers 207 which are adapted to abut against the top cover 135 and to maintain the back section 201 in horizontal position on the cabinet section 2.

Screwed to the underface of the base members 202 in parallel spaced relation to the elongated apertures 181 of the top cover 135 are flanged hardened steel tracks 204 which slidably accept the arcuate ends 182 of the counterbalancing arms 179. The arms 179, of course, urge the arcuate ends 182 against the tracks 208 whereby to provide a counterbalancing moment about the hinge pin 200 which partially overcomes the moment created thereabout by the weight of back section 201.

Intermediate the tracks 208 and leg 206 the underface of the base member 202 is centrally provided with a bifurcated bracket 209 having a transversely extending pin 210 to which the depending back support rod 211 is swingably secured. Back support rod 211 fits slidably within the elongated aperture 169 of ear 168 when one of the actuating levers 176 is moved toward the head end of cabinet section 2 so as to present ear 168 in a plane which is substantially perpendicular to the axis of the rod 211. Thus, with little effort the back section 201 can be swung upwardly or downwardly with the rod 211 sliding within the elongated aperture 169. However, when the actuating lever 176 is released, the ear 168 will swing downwardly on the cross rod 167 and owing to the weight of the arms 170 and linkages 171 will cause the walls of the elongated aperture 169 to snugly bear against, or in other words bind, the support rod 211 in a stationary position, which, of course, will hold the back support 201 in spaced angulated relation to the top cover 135. Screwed to the underface of head rest member 204 in close proximity to one lateral margin thereof is a bracket 212 provided with an aperture 213. Similarly secured to the head rest member 200 near the opposite lateral margin thereof is a bracket 214 provided with a J-shaped cutout 215 which terminates at the outer downwardly presented margin of the bracket 214. Aperture 213 and cutout 215 receive spindles 216 of a paper roll 217 around which is rolled a strip of paper $p$ for covering the top of the table section 3.

Secured to underface of the base member 201 and head rest member 204 and projecting downwardly therefrom having their outer faces coplanar to the lateral edges of the base member 201 are the wooden lateral skirts 218 which are transversely connected across the head rest by an end skirt 219. The back section 201 is conventionally upholstered with an attractively colored cover 220 which is internally stuffed with a foam rubber or other suitable cushioning substance.

Figure 3:
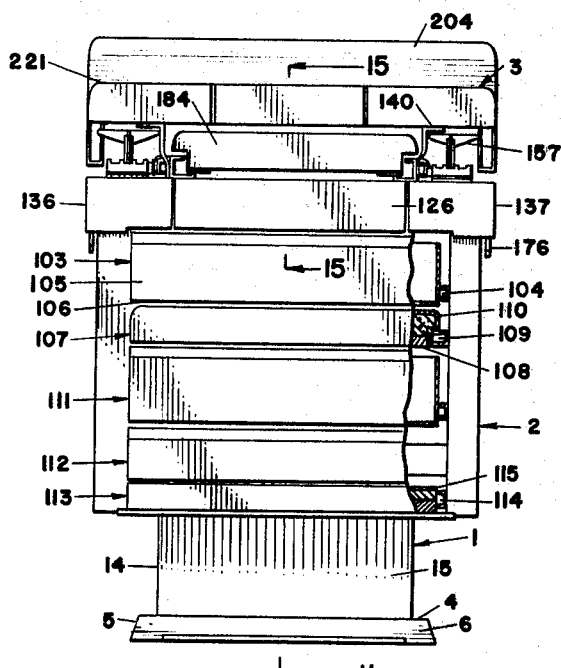
FIG. 3 is a front elevational view, partially broken away, of the examining table.
Figure 4:
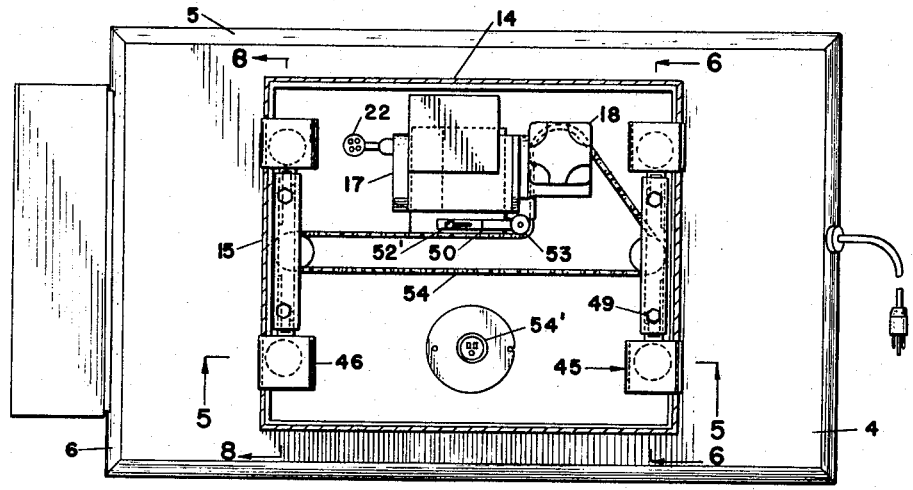
FIG. 4 is a sectional view taken along line 4—4 of FIG. 2.
Figure 5:
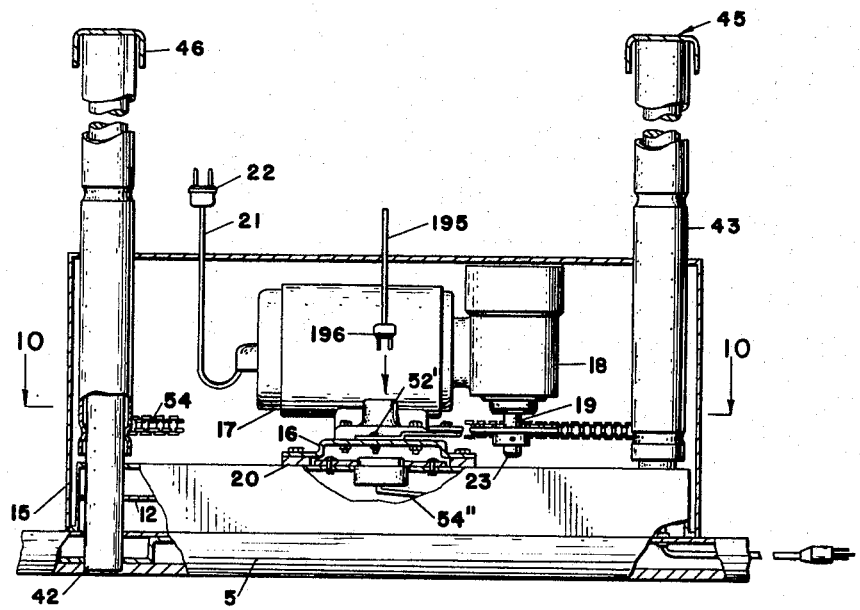
Figure 7:
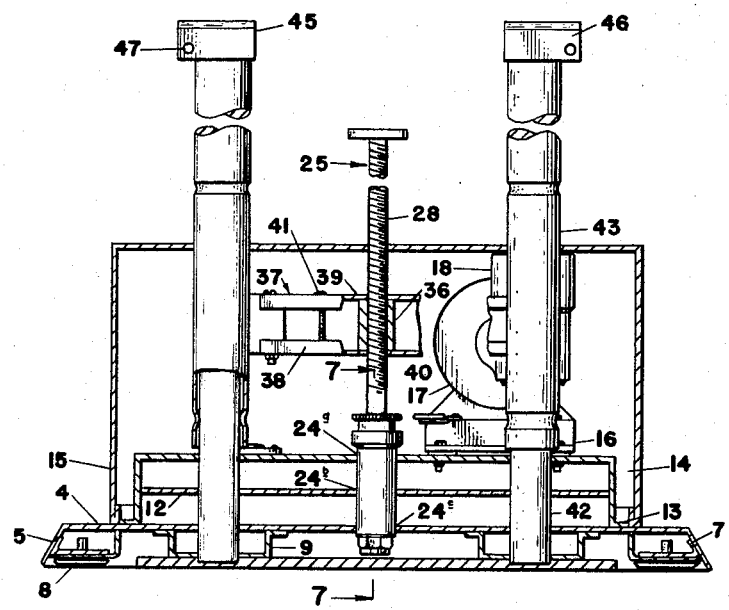
FIG. 7 is a sectional view taken along line 7—7 of FIG. 6.
Figure 9:
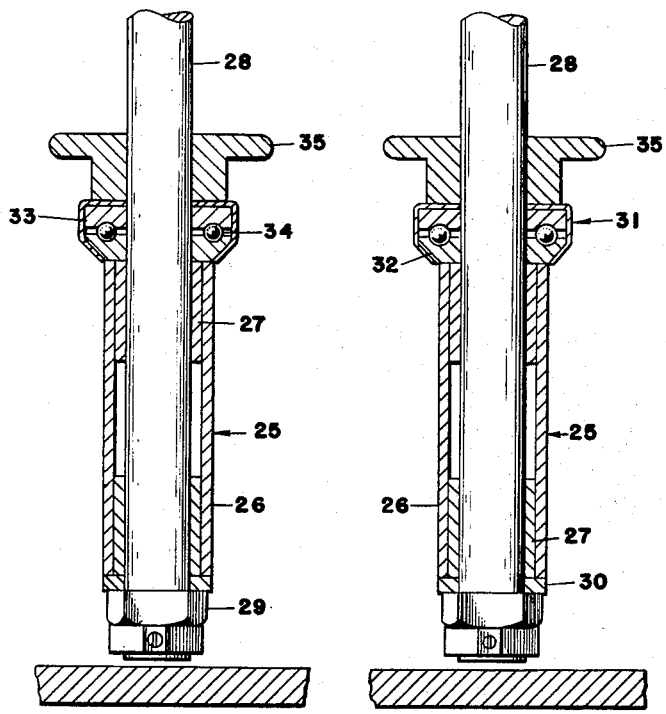
FIG. 9 is a sectional view taken along line 9—9 of FIG. 8.

Also swingably mounted on the hinge pin 200 and forming part of the top section 3 is a seat section 221 including a plywood or other suitable base 222 to which at one end margin a transversely extending angled hinge plate 223 is screwed. As will be seen by reference to FIGS. 3, 26, one end of seat section 221 is supported by the hinge plate 223 which is swingably mounted on the hinge pin 200, while the opposite end, that is to say the foot end, is supported by the upstanding seat supports 140. Intermediate its ends the underface of the base member 218 is provided with a pair of hinges 224 which swingably support the legs 225. Transversely connecting the legs 225 to insure simultaneously movement thereof is a cross member 226 having handles 227 projecting therefrom perpendicular to the longitudinal axis of legs 225. Secured to the cross member 226 and the underface of seat section 221 is a tension spring 228 for biasing legs 225 to a retracted position in which the legs 225 are in lengthwise abutment with the underface of seat section 221. It should be noted that the handles 227 and the cross member 226 are sized and positioned so as not to interfere with the movement of leg rest 184. Thus it is possible to elevate the seat section 221 by lifting it off the seat supports 140 and pulling the cross member 226 until it is brought in facewise abutment with the underface of base 222. Instead of being supported horizontally on the seat supports 140, the seat section 221 will now angularly rest upon the legs 225 which, of course, abut against the top cover 135 of cabinet section 2. To bring the seat section 221 back to the horizontal or normal position it is merely necessary to lift the foot end of the seat section 221 whereby the spring 228 will snap the legs 225 back into lengthwise abutment with the underface of base 222.

The foot end of base section 222 is arcuately cut-out in the provision of a perineal cut-out 229. Firmly secured to the underface of base member 222 and projecting beyond the margins of the perineal cut-out 229 are flat support plates 230 and a flat engagement plate 231, the latter being provided with an upstanding cylindrical boss 232. Removably disposed in the perineal cut-out 229 is a filler section 233 including a plywood or suitable base 234 which rests upon the support plates 230 and engagement plate 231, the base 234 being provided with an aperture 235 which receives the cylindrical boss 232 whereby to prevent endwise removal of the filler section 233.

Secured to the underface of the base member 222 and depending therefrom along its lateral margins are wooden skirts 236 which are coplanar with skirts 218 of back section 201. Seat section 222 and filler section 233 are upholstered with attractively colored covers 237, 238, respectively, the covers 237, 238 being stuffed with foam rubber or other suitable cushioning substance.

At this juncture it should be noted that the filler section 233 can readily be removed and the pan mount 122 pulled out on the tracks 120, whereupon one can grasp the handle 134 and pull the frame 129 up to its elevated position. The pan mount 122 can thereupon be pushed back into the cabinet section in the elevated position with the pan 131 being presented in close proximity and in downwardly spaced surrounding relationship to the perineal cut-out 229.

It should be understood that changes and modifications in the form, construction, arrangement, and combination of the several parts of the examining tables may be made and substituted for those herein shown and described without departing from the nature and principle of my invention.

Having thus described our invention, what we claim and desire to secure by Letters Patent is:

1. A physician's examining table comprising a base section, a cabinet section carried by said base section, a body supporting means operatively carried by said cabinet section and including back and seat sections hingedly secured to said cabinet section for movement from a horizontal position to angulated positions, a counterbalancing arm rotatively mounted on the cabinet section and having its one end in engagement with the undersurface of the back section, the counterbalancing arm being presented at an acute angle with respect to the back section when the back section is in the horizontal position, a counterbalancing spring interconnecting the cabinet section and counterbalancing arm for urging the arm against the back section so as to exert a force there which is in opposition to the downwardly present force created by the weight of the back section, and locking means for optionally holding said back section in a desired angulated position.

2. A physician's examining table comprising a base section, a cabinet section carried by said base section, a body supporting means operatively carried by said cabinet section, a transversely extending hinge pin carried by said cabinet section in upwardly spaced relation thereto, said body supporting means including back and seat sections hingedly fastened to said hinge pin whereby to permit said back and seat sections to move angularly from a horizontal position to angulated position, adjusting means for holding said seat section in an angulated position, and locking means for optionally holding said back section in a desired angulated position, said locking means including a back support rod swingably secured to the back section in spaced relation to the hinge pin, a cross rod journaled on the cabinet section, a locking ear rigidly secured to and projecting outwardly from the cross rod, the ear having an elongated aperture for slidably accepting the back support rod, the end margins of the elongated aperture being biased into frictional engagement with the support rod to hold the back section in a preselected position, a lever arm rigidly fastened to and projecting from the rod, a cross shaft rotatably carried by the upstanding support, an actuating lever carried by the cross shaft, an actuating arm secured to the cross shaft for rotational movement with the actuating lever, and a connecting link interconnecting the lever arm and actuating arm whereby when the actuating lever is moved the ear will rotate so that the end margins thereof move away from engagement with the support rod enabling the angular disposition of the back section to be altered.

3. An examining table according to claim 2 in which the cabinet section has a side face and an upper skirt which projects downwardly from the upper surface of the cabinet section in spaced relation to the side face, the actuating lever being partially interposed between the side face and skirt so that the skirt masks a portion of the actuating lever.

4. A physician's examining table comprising a base section, a cabinet section carried by said base section, a body supporting section carried by said cabinet section and including a seat section and a back section, said seat section being provided with a perineal cut-out, a pan mount base slidably mounted in said cabinet section, swing arms journaled to said pan mount base, and a frame for supporting a pan, said frame being journaled to said swing arms whereby to permit said frame to swingably move with respect to said pan mount base from a first position up over center on said swing arms to a second position in upwardly spaced relation to said first position, said pan when said frame is in said second position having its upper margins in close proximity to the plane defined by the lower margins of said perineal cut-out.

5. A physician's examining table comprising a base section, a cabinet section carried by said base section, and a body supporting section carried by said cabinet section and including a seat section and a back section, said seat section being provided with a perineal cut-out, a pan mount base slidably mounted in said cabinet section, swing arms journaled to said pan mount base, a frame journaled to said swing arms whereby to permit said frame to swingably move with respect to said pan mount base from a first position, up over center on said swing arms to a second position in upwardly spaced relation to said first position, said pan when said frame is in said second position having its upper margins in close proximity to a plane defined by the lower margins of said perineal cut-out, said pan mount base and frame being adapted to move horizontally from an inner position beneath said seat section, past an intermediate position wherein said pan is below said perineal cut-out, to an outer position wherein said pan can be removed from said frame for disposing of the contents thereof.

6. A physician's examining table comprising a base section, a cabinet section carried by said base section, a body supporting section carried by said cabinet section and including a seat section and a back section, said seat section being provided with a perineal cut-out, a pan mount base slidably mounted in said cabinet section, swing arms journaled to said pan mount base, a frame for supporting a pan, said frame being journaled to said swing arms whereby to permit said frame to swingably move with respect to said pan mount base from a first position up over center on said swing arms to a second position in upwardly spaced relation to said first position, and an abutment member for supporting said frame in said second position, said pan when said frame is in said second position having its upper margins in close proximity to the plane defined by the lower margins of said perineal cut-out.

7. A physician's examining table comprising a base section, a cabinet section carried by said base section, a body supporting means carried by said cabinet section, elevating means carried by said base section for raising and lowering said cabinet section, said body supporting means including a seat section and a back section hingedly mounted on said cabinet section for angular movement from a horizontal position to an angulated position, locking means for optionally holding said back section in desired angulated positions, actuating means for disengaging said locking means whereby to permit movement of said back section, said actuating means being accessible from either transverse side of said cabinet section, said seat section being provided with a perineal cut-out, a pan mount for removably supporting a pan and being slidably mounted in said cabinet section for horizontal movement from an inner position, past an intermediate position wherein said pan is beneath said perineal cut-out, to an outer position wherein said pan can be removed for disposal of the contents thereof, said pan mount being adapted to support said pan in a first vertical position and a second vertical position, said second vertical position being in upwardly spaced relation to said first position whereby to present the upper margins of said pan in close proximity to a plane defined by the lower margins of said perineal cut-out, and a plurality of drawers slidably carried by said cabinet section, said cabinet section being adapted to receive said drawers for withdrawal from either transverse side thereof.

8. A physician's examining table comprising a base section, a cabinet section carried by said base section, a body supporting means carried by said cabinet section, elevating means carried by said base section for elevating said cabinet section, said elevating means including first and second threaded upstanding shafts journaled within said base section, first and second nuts carried by the threads of said first and second shafts, respectively, first and second upstanding guide rods securely fastened to said base member, first and second support tubes telescopically mounted on said first and second upstanding rods, respectively, for supporting said cabinet section, first connecting arms operatively joining said first nut to said first support tubes, second connecting arms operatively joining said second nut to said second support tubes, whereby said tubes move upwardly and downwardly with said nuts, chain sprockets rigidly secured to the first and second shafts, a motor mounted on the base section and having a drive shaft provided with a chain sprocket, a chain trained around said sprockets whereby when the motor is actuated the first and second shafts will revolve simultaneously and move the nuts and cabinet section vertically.

9. A physician's examining table comprising a base section, a cabinet section and having an internal drawer-receiving cavity extending laterally therethrough carried by said base section, a body supporting means carried by said cabinet section, elevating means carried by said base section for elevating said cabinet section, said elevating means including first and second threaded upstanding shafts journaled within said base section on opposite sides of the drawer-receiving cavity, first and second nuts carried by the threads of said first and second shafts, respectively, first and second pairs of upstanding guide rods securely fastened to said base member on opposite sides of the cavity, first and second support tubes telescopically mounted on said first and second upstanding rods, respectively, for supporting said cabinet section, first support arms interconnecting said first support tubes and said first nut, second support arms interconnecting said second nut and said second support tubes, chain sprockets fastened to the first and second shafts, a reversible motor mounted on the base section and having a drive shaft provided with a chain sprocket, and a chain trained around the sprockets whereby when the motor is actuated the chain will revolve the first and second shafts simultaneously and raise or lower the cabinet section.

10. A physician's examining table comprising an upstanding support, a body-supporting section carried by the support, a pan carrier slidably mounted on the upstanding support section for substantially horizontal shiftable movement beneath the body-supporting section, a frame adapted to engage and support a pan, elevating means interposed between the frame and pan carrier for moving the frame from a lower position wherein the pan is located in spaced relation to the undersurface of the body-supporting section to an upper position wherein the upper margin of the pan is located in close proximity to the undersurface of the body-supporting section, and a rest member slidably mounted on the upstanding support intermediate the pan carrier and body-supporting section for shiftable movement from a retracted position wherein it is beneath the body-supporting section to an extended position wherein it is presented beyond the end of the body-supporting section, the rest member clearing the frame and pan when the frame is in the lower position.

11. A physician's examining table comprising an upstanding support, a body-supporting section carried by the upstanding support and provided with a perineal cut-out, a pan carrier slidably mounted on the upstanding support for substantially horizontal shiftable movement beneath the body-supporting section, a frame adapted to engage and support a pan, elevating means interposed between the frame and pan carrier for moving the frame from a lower position wherein the pan is located in spaced relation to the body-supporting section to an upper position wherein the upper margin of the pan is located in close proximity to the undersurface of the body-supporting section, whereby the pan can be disposed beneath the perineal cut-out by shifting the pan carrier, and a leg rest slidably mounted on the upstanding support intermediate the pan carrier and body-supporting section, the leg rests being adapted for shiftable movement from a retracted position wherein it is located beneath the body-supporting section to an extended position beyond the end of the body-supporting section, the leg rest clearing the frame when the frame is in the lower position.

12. A physician's examining table comprising an upstanding support, a body-supporting section carried by the upstanding support and provided with a perineal cut-out, a pan carrier slidably mounted on the upstanding support for substantially horizontal shiftable movement beneath the body-supporting section, a frame adapted to engage and support a pan, and swing arms journaled to the frame and pan carrier so that the frame can swing upwardly on a swing arm from the lower position wherein the pan is located in spaced relation to the body-supporting section to an upper position, wherein the upper margin of the pan is located in close proximity to the undersurface of the body-supporting section, whereby the pan can optionally be disposed beneath the perineal cutout by shifting the pan carrier.

13. A physician's examining table according to claim 12 and further characterized by stop means formed on the pan carrier for engaging the frame after the swing arms have passed over center and into the upper position to maintain the frame and pan in the upper position.

14. An examining table comprising an upstanding support, a back section, hinge means for hingedly connecting the back section and the upstanding support, a back support rod swingably secured to the back section in spaced relation to the hinge means, a cross rod journaled on the upstanding support beneath the back section, a locking ear rigidly secured to and projecting from the cross rod, the ear having an elongated aperture for slidably accepting the back support rod, the end margins of the elongated aperture being normally biased into frictional engagement with the support rod so as to bind against the support rod to hold the back section in a preselected position, a lever arm rigidly fastened to and projecting from the cross rod, a cross shaft rotatably carried by the upstanding support, an actuating lever carried by the cross shaft, an actuating arm secured to the cross shaft for rotational movement with the actuating lever, and a connecting link interconnecting the lever arm and actuating arm whereby when the actuating lever is moved the ear will rotate so that its end margins move away from binding engagement with the support rod enabling the angular disposition of the back section to be altered.

15. An examining table according to claim 14 in which the lever arm and ear project from the cross rod in substantially the same direction so that the weight thereof creates a moment about the cross rod for biasing the end margins of the elongated aperture into frictional engagement with the support rod.

16. An examining table according to claim 15 in which the link is provided with a longitudinal slot and the actuating arm in spaced relation to the cross shaft is provided with a pin which slidably fits within the slot whereby the actuating lever, cross shaft and actuating arm revert to the same position when released irrespective of the position of the locking ear.

17. An examining table according to claim 16 in which the actuating arm is located inwardly on the cross shaft from the actuating lever.

18. An examining table according to claim 17 in which the upstanding support includes a side face and an upper skirt which projects downwardly from the upper surface of the upstanding support in outwardly spaced relation to the side face, the actuating lever being interposed between the side face and skirt, a portion of the actuating lever depending below the lower margin of the skirt for convenient manipulation.

19. An examining table according to claim 1 in which the back section is provided on its undersurface with a track which is engaged by the ends of the counterbalancing arm, the track having downwardly projecting flanges for preventing lateral movement of the end of the counterbalancing arm.

20. An examining table according to claim 1 in which the spring is connected to the counterbalancing arm in downwardly spaced relation to the point at which the arm is rotatably mounted on the cabinet section.

21. A physician's examining table comprising a base section, a cabinet section carried by the base section, a body-supporting section carried by the cabinet section, the cabinet section having a laterally extending central cavity, drawer support assemblies removably secured to the cabinet section and projecting into the cavity, drawers slidably mounted on the drawer support assemblies for movement from a retracted position wherein they are disposed entirely within the cavity to extended position wherein they project beyond a selected side of the cabinet section, the drawer guides being removable for reversible mounting so that the drawers can open out of the opposite side of the cabinet section, side panels removably secured to the selected side of the cabinet section and covering the portion thereof not masked by the drawers, a continuous cover panel removably secured to and covering the opposite side of the cabinet section, the side and cover panels being sized and adapted for interchangeable mounting on either side of the cabinet section depending on the side out of which the drawers open.

22. An examining table according to claim 21 in which there is a side panel on each lateral side of the drawers and a single cover panel which covers the entire opposite side of the cabinet section.

23. An examining table according to claim 21 in which the cabinet section includes a pair of rectilinear frames presented on each side thereof and marginally defining the cavity, the frames having inwardly turned side flanges to which the drawer support assemblies are removably fastened.

24. A physician's examining table according to claim 23 in which the drawer support assemblies comprise support plates removably fastened to the inwardly turned flanges and laterally extending drawer tracks rigidly fastened to and interconnecting the support plates.

References Cited

UNITED STATES PATENTS

| | | | |
|---|---|---|---|
| 499,310 | 6/1893 | Towle | 4—135 |
| 516,293 | 3/1894 | Beretta | 312—285 |
| 542,060 | 7/1895 | Lentz | 312—209 |
| 658,999 | 10/1900 | Scannell | 312—209 |
| 686,831 | 11/1901 | Nason | 5—90 |
| 987,189 | 3/1911 | Thorner | 269—327 |
| 1,078,894 | 11/1913 | Ashby | 269—325 |
| 1,527,895 | 2/1925 | Mazoch | 108—147 |
| 2,249,455 | 7/1941 | Caldnell | 108—147 |
| 2,314,778 | 3/1943 | Froelich | 269—324 |
| 2,455,156 | 11/1948 | Balzi | 312—28 |
| 2,552,370 | 5/1951 | Curtis | 269—328 |
| 2,606,801 | 7/1952 | Shampaine | 269—324 |
| 2,679,445 | 5/1954 | Roehm | 312—209 |
| 3,016,275 | 1/1962 | Grant | 312—209 |
| 3,089,741 | 5/1963 | Burton | 312—223 |

FOREIGN PATENTS

| | | |
|---|---|---|
| 724,310 | 2/1955 | Great Britain. |
| 3,178,169 | 4/1965 | Great Britain. |

CHANCELLOR E. HARRIS, *Primary Examiner.*